Figure 1:
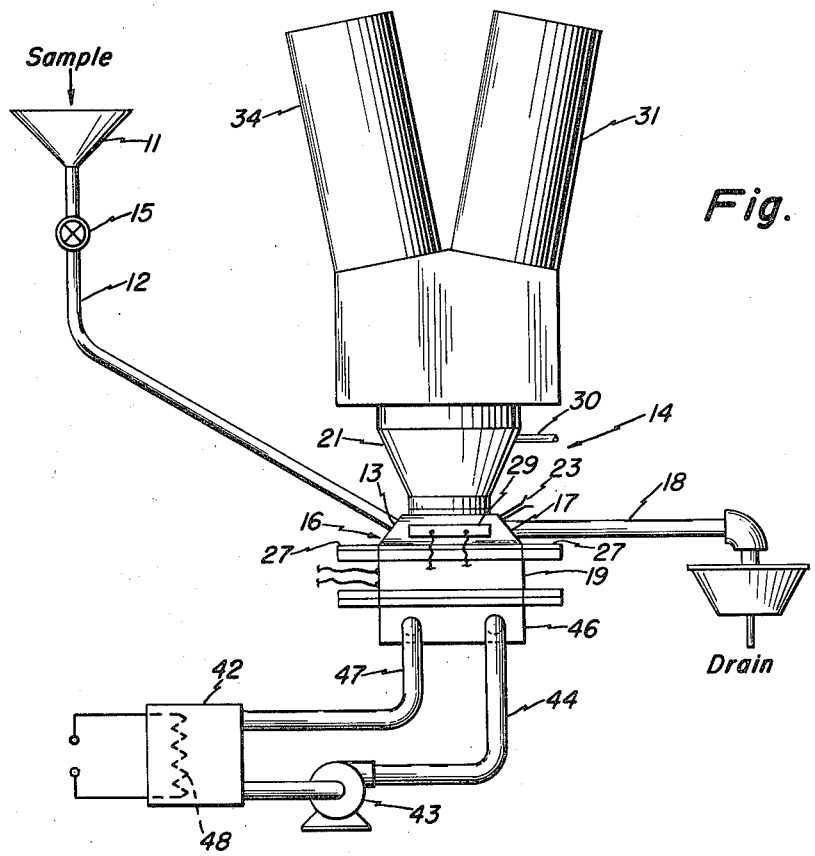

Dec. 15, 1964  S. F. KAPFF  3,161,039
APPARATUS FOR DETERMINING POUR POINT
Filed Jan. 19, 1961  3 Sheets-Sheet 1

INVENTOR.
Sixt Frederick Kapff
BY
*William T. McClain*
ATTORNEY

INVENTOR.
Sixt Frederick Kapff
BY
William F. McClain
ATTORNEY

INVENTOR.
Sixt Frederick Kapff
BY
William P. McClain
ATTORNEY

United States Patent Office 3,161,039
Patented Dec. 15, 1964

3,161,039
APPARATUS FOR DETERMINING POUR POINT
Sixt Frederick Kapff, Homewood, Ill., assignor to Standard Oil Company, Chicago, Ill., a corporation of Indiana
Filed Jan. 19, 1961, Ser. No. 83,824
5 Claims. (Cl. 73—17)

This invention relates to an apparatus for determining the pour point of a hydrocarbon oil, and particularly to such an apparatus for determining the pour point of petroleum products having particular properties.

In the production of various petroleum products one of the most critical product specifications is that of pour point. Pour point is defined as being the lowest temperature at which an oil will just pour, or flow, under its own weight under specified conditions. The pour point test is most generally carried out in the laboratory according to ASTM "Standard Method of Test for Cloud and Pour Points," D97–57, by placing a small quantity of oil into a standard bottle which is then placed in a succession of freezing mixtures. A thermometer is fixed in the oil, and as the temperature falls, the bottle is removed from the cooling bath at every 5° F. fall in temperature and tilted to determine whether the oil will flow. The lowest temperature at which the oil still remains liquid, or flowable, is known as the pour point. This test is quite time consuming, requires the constant attention of an operator and is subject to errors by the operator. The production of many petroleum products, particularly fuel oils such as are used for domestic heating purposes, is frequently limited by pour point specifications. In such a case a rapid means of measuring the pour point enables the specification limit to be more nearly approached and will aid in maximizing the efficiency of the production operation.

An object of this invention is an apparatus for automatically and continuously determining the pour point of a liquid hydrocarbon in a simple but accurate manner. Another object is an apparatus which reduces the time required for conducting the pour point test and which does not demand the constant attention of an operator. Still a further object is a pour point apparatus which is suitable for use in process control in a production plant, as well as the laboratory, which apparatus is relatively inexpensive and easy to maintain. A particular object is an apparatus which will aid in maximizing the operational efficiency of a petroleum refinery producing non-viscous light oils which must meet critical pour point specifications. Other objects will become apparent from the following description of the present invention.

These objects are achieved by introducing a sample of a non-viscous light hydrocarbon oil which solidifies over a narrow temperature range into a shallow cavity in a sample cell, the contained sample forming a thin platelet of a uniform thickness, whereby temperature gradients across the sample are minimized and the sample temperature closely follows the temperature of the container during cooling. The sample is then uniformly cooled to at least its solidification temperature. A light source is directed onto the surface of the sample to provide a reflection therefrom. When the sample cools to its solidification temperature a change in the reflectivity of the sample surface occurs. The temperature is then determined at which the amount of reflected light decreases.

A preferred form of apparatus employed for determining the pour point comprises a sample cell adapted to contain a thin, plate-like sample of oil at a preselected level in the cell, means for cooling the sample and the sample container to at least the solidification temperature of the sample, light source means for directing a beam of light onto the surface of the sample, light sensitive means for receiving light reflected from the surface of the sample and means for indicating the temperature at which a change occurs in the reflectivity of the sample surface as a measure of the pour point of the sample.

Figure 3:
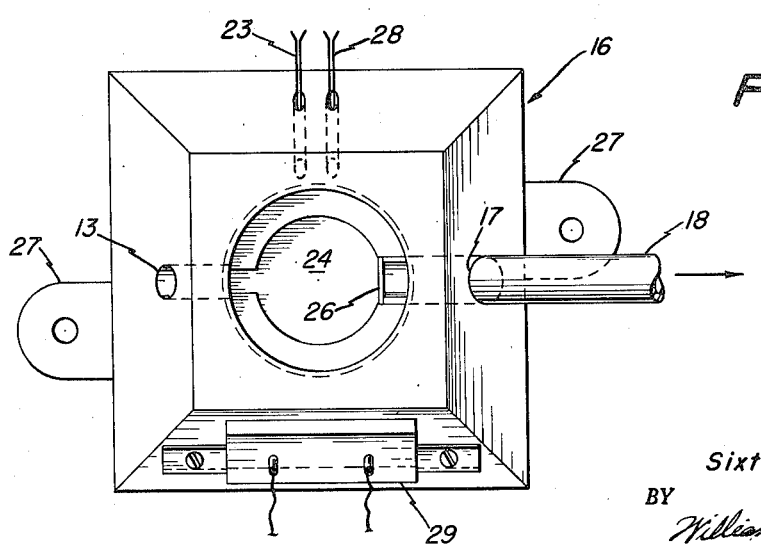
Figure 2:
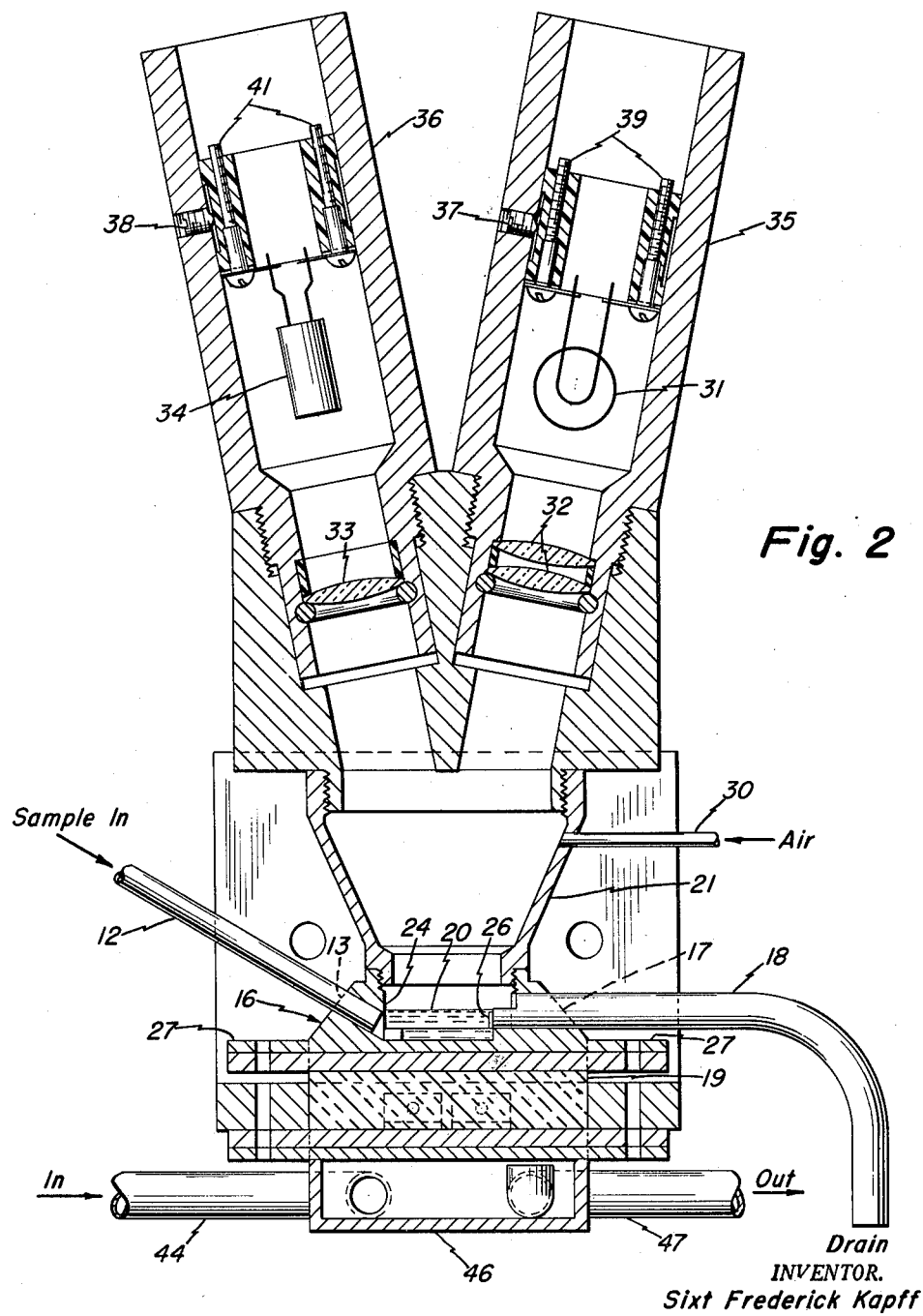
Figure 4:
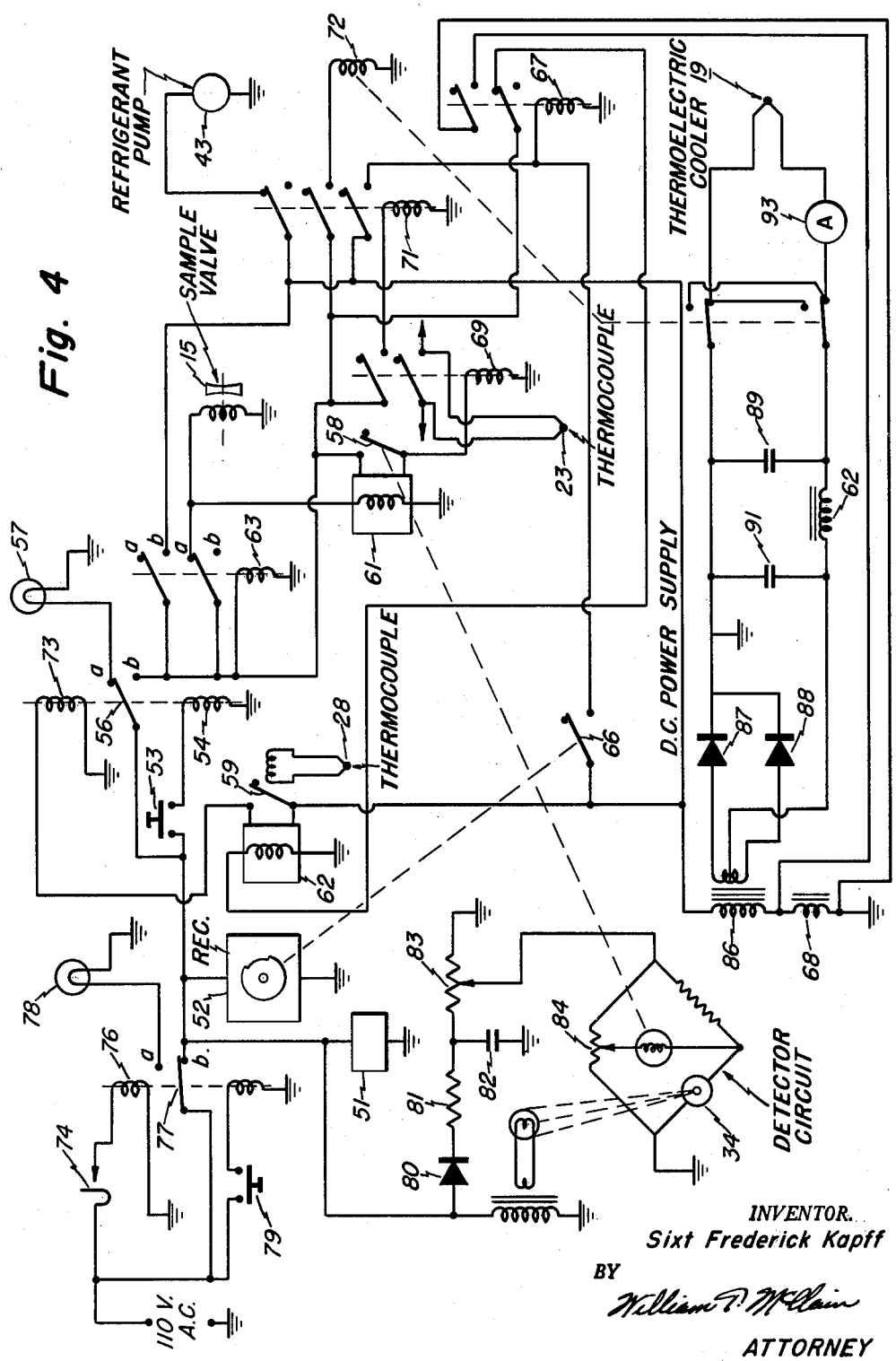

A fuller understanding of my invention will be obtained by referring to the following description of the accompanying drawings, wherein:

FIGURE 1 is a schematic representation of the preferred embodiment of the pour point apparatus, FIGURE 2 is a detailed cross-sectional view of the preferred embodiment of the pour point apparatus, FIGURE 3 is a detailed plan view of the preferred sample cell employed in the apparatus, and FIGURE 4 is a schematic representation of the preferred electrical system employed in the apparatus.

Referring to the drawings, in FIGURE 1, a sample of oil to be tested is taken directly from an operating unit or otherwise and introduced into a sample container 11 of approximately 40 ml. volume which is connected by line 12 to the inlet 13 of the pour point apparatus 14. A valve 15 is provided in line 12 to facilitate filling the sample cell. Preferably, the valve 15 is automatically operated so that it may be opened and closed at preselected intervals. The oil sample flows by way of line 12 into sample cell 16 which is provided with an outlet 17 for removing sample from the sample cell by way of drain line 18. The sample cell and outlet are so designed to provide a thin, plate-like sample of oil in the bottom of the sample cell, which oil is at a preselected, substantially constant level during a particular test, as well as from one test to another.

The sample cell 16 is cooled, preferably by a thermoelectric element 19 in thermal contact therewith. The thermoelectric element is adapted to cool the sample in the sample cell to at least the solidification temperature of the sample. Advantageously, the apparatus is positioned in an insulated housing 21 to reduce the load on the cooling element and to aid in maintaining reproducible temperature conditions.

A light source 31 is directed onto the surface of the sample in the sample cell and light reflected from the sample surface is received in a light sensitive element 34 such as a photocell. A temperature sensing means such as thermocouple 23 is employed to indicate the temperature of the sample and preferably provides a signal to a recorder which records the sample temperature during the test.

A preferred embodiment of the sample cell 16 is illustrated in FIGURE 3 of the drawings. The cell itself is advantageously fabricated from a material such as aluminum, copper or other material having a high thermal conductivity. The sample admitted to the cell through inlet 13 is contained in a cylindrical cavity 24 and maintained at a depth which is determined by the weir 26 in the outlet 17.

Referring to FIGURE 2, the sample 20 has a preferred depth of about 2 millimeters, corresponding to a test volume of about 1 ml. However, the sample depth may be as great as 6 mm. or so. The maximum sample depth selected will be dependent upon the properties of the oil sample and the capacity of the cooling element employed in the apparatus. Excess sample resulting from the filling operation overflows weir 26 and it is passed out of the system by way of outlet 17 and drain line 18. Preferably, the sample cell is provided with lugs 27 adapted to secure the sample cell in thermal contact with the thermoelectric element 19.

Advantageously, the bottom of the sample cell cavity 24 is blackened to provide a reflectivity which is less than that of the surface of the sample to be tested. This minimizes unwanted reflections and enables the apparatus to obtain reproducible results from one test to another wherein oils of varying colors may be tested.

Likewise, the cup geometry is important in obtaining reproducible results. A shallow cavity is desired to reduce the sample thickness and the level of sample in the cavity is maintained substantially constant by the overflow weir in the outlet. A small mass of oil is desired in order to enable the sample temperature to easily follow the temperature of the thermally conductive sample cell without exhibiting a temperature gradient of any significant magnitude. Additionally, the small sample mass is desired to be consistent with the capacity of the thermoelectric element 19.

Thermocouple 23 is fitted into the sample cell 16, which, as mentioned previously, is at substantially the same temperature as the sample itself. This thermocouple provides a signal to a circular-chart recorder used to record the sample temperature. Preferably, a second thermocouple 28 is employed and connected to a relay which is actuated at a predetermined temperature to stop the defrost cycle (to be described later). A thermo-switch 29 also is employed to sense the sample cell temperature and to cut off the power during the defrost cycle if thermocouple 28 and its associated relays should fail to act.

The preferred optical light sensing system is illustrated in detail in FIGURE 2. Light from lamp 31 is focused by condensing lens 32 onto the surface of the sample contained in the sample cell 16. The light reflected from the surface of the sample is collected by lens 33 and refocussed onto a light sensitive element such as the photocell 34. Decrease in the amount of light striking the photocell 34 caused by sample freezing causes an unbalance in the photocell circuit which, in turn, causes the thermocouple 23 to short out. The recorder drives upscale and the pour point of the sample coincides with the minimum in the temperature spike recorded.

The lamp 31 and the photocell 34 preferably are mounted in housings 35 and 36 respectively, and secured in place by means of set screws 37 and 38 so that these elements may be moved in respect to the lens systems in order to provide the desired focusing. Electrical contacts 39 are connected to a suitable source of power to operate the lamp 31, and electrical contacts 41 connect the photocell 34 to the elements of the photocell circuit shown in FIGURE 4.

The thermoelectric element 19 is a commercially available device such as the Thermoelectric Unit No. WX 814, available from Westinghouse Electric Corporation. The operation of thermoelectric units is well known and is described in easily available literature. Fundamentally, the thermoelectric unit operates on the Peltier, or thermoelectric, effect. When two different materials are joined and an electric current is passed through them the junction can be cooled or heated, depending upon the direction of current flow. The amount of cooling, for example, depends upon the amperage of the direct current supplied and upon the materials employed in the unit. Heat must be removed from the "hot" side of the unit to achieve low temperatures on the "cold" side of the unit. This is accomplished by circulating a cold liquid from sump 42 by means of pump 43 by way of line 44 through cooler 46 which is mounted on the hot side of the thermoelectric cooler 19. The cold liquid is returned by way of line 47 to the reservoir 42. The liquid in the sump 42 preferably is maintained at a temperature of about 15° F. by a cooling coil 48 which is connected to a standard refrigeration unit. The sample cell 16 is mounted on the "cold" side of the thermoelectric element 19 and is thus cooled directly.

The electrical system provided to achieve the desired function of the various elements described above is illustrated in FIGURE 4. This system provides the desired features to enable the apparatus to be used under varied conditions while handling a wide range of samples and giving reproducible results. A description of the typical sampling cycle will serve to indicate the function of the various elements of the electrical system.

When the instrument is first connected to a power source such as a 110 volt A.C., power is supplied to refrigeration unit 51, recorder 52, and the light sensitive system described above. When start button 53 is depressed coil 54 is actuated, moving switch 56 to point $b$ and latching it there. This removes power from a green light 57 which was illuminated previously, indicating that the instrument is ready to begin a test. Switch 56 now provides power to: ($a$) open valve 15 letting sample flow through the sample cell; ($b$) open the high sensitivity relay switches 58 and 59 through reset coils 61 and 62, respectively; ($c$) energize coil 63 of the relay 64 which is of the time delay type which throws after 60 seconds. This time delay is necessary to permit the sample to flow through the sample cell as described above. During this period, through the high sensitivity relay reset action, the photocell sensing system is neutralized. This prevents any reflections from the flow sample from actuating this circuit.

After 60 seconds, relay 64 moves the switches to position $b$. This action: ($a$) starts the refrigerant circulation pump 43; ($b$) closes sample valve 15; ($c$) provides power to direct current power supply causing the thermoelectric element 19 to begin cooling the sample cell; ($d$) removes reset power from sensitrol coil 61. This latter action renders the pour point sensing system operable.

Two sample cooling rates are provided. When the recorder 52 indicates a temperature of about 30° F. and the pour point has not been reached, switch 66 closes relay 67 which ($a$) shorts out choke 68 and ($b$) removes reset power from relay reset coil 62. The presence of choke 68 serves to reduce the current through thermoelectric cooler 19 during the first part of the cooling cycle. This provides a desirable initial slow cooling rate. The reset is retained on coil 62 until this point because at the start of the test the sample cell temperature is high enough to cause this relay to operate.

Cooling then continues at a more rapid rate until the sample solidification temperature is reached. At this point decreased light on photocell 34 unbalances the bridge of the detector circuit causing relay switch 58 to close. This closes relay 69 which ($a$) shorts out the thermocouple 23 input to recorder 52 driving the pen up scale; ($b$) throws relay 71 which turns off refrigerant pump 43 and holds relay 67 closed independently of switch 66 which opens when the recorder drives upscale, and further energizes relay 72 which reverses the current through the thermoelectric element 19 causing the sample cell to be heated to at least its flow point.

This heating continues until switch 59 closes on signal from thermocouple 28. This provides power to coil 73, the unlatching coil of the relay moving switch 56 to position $a$, lighting the green light 57 and removing power from all other elements beyond this switch.

If the thermocouple 28 should not close the relay contacts at the proper time due to some malfunction, serious overheating and damage to the thermoelectric cooler 19 could result. To protect against this possibility, thermoswitch 29 (Fenwal #32411 Thermoswitch) having contacts 74 is fastened to the sample cell 16. Contacts 74 will close at a slightly higher temperature than relay contacts 59. This will, through coil 76 move switch 77 to position $a$ and lock it there. This lights an amber trouble light 78 and also prevents the system from being operated. Reset switch 79 is provided inside the instrument to allow the unlatching of relay 77 after the difficulty has been corrected.

Elements 80, 81 and 82 provide direct current to the detecting bridge circuit, and element 83 controls sensitivity of the bridge while element 84 controls bridge zero. Elements 86, 87 and 88 provide direct current for the thermoelectric cooler and elements 89, 91 and 92 serve to remove the ripple from the direct current. Ammeter 93 is provided for reading the D.C.

In a preferred embodiment of the invention, a large volume of oil, i.e. about 40 ml., is provided in the sample container 11 whereby after the completion of a test a portion of the incoming oil to be used in the next successive test flushes the previous sample from the sample cell 16 through the outlet 17. Excess incoming oil also passes from the apparatus and a sample of the desired thickness is retained in the cavity 24 by weir 26.

Advantageously, the apparatus housing may be pressurized, as by a low-pressure air stream admitted during sample introduction, to aid in removing excess sample from the sample cell while aiding in maintaining a constant level of sample in the sample cell. Preferably, this air stream is introduced between the lens systems and sample surface through the air inlet 30. The air then exerts a slight pressure on the liquid sample and excess flows through the outlet line 18 to the exterior of the apparatus.

The apparatus described above has been operated to give a direct reading in the range of about 30° F. to −30° F. The ASTM pour point is defined as the temperature at which flow was last observed, being 5° F. above the temperature at which the sample was observed not to flow. Since the apparatus of the invention records the solidification temperature, its uncorrected readings would be 5° F. lower than the ASTM D-97 pour point measurements. To eliminate this discrepancy, the recorder preferably is adjusted to read 5° F. high, whereby the observed solidification temperature is employed as a measure of the standard ASTM pour point.

Pour points may be determined as described above for oils such as heater oil, domestic furnace oil, diesel oil and other non-viscous light oils. In general, these oils have a viscosity of less than about 100 seconds, Saybolt Universal (100° F.), and usually less than about 60 seconds, Saybolt Universal (100° F.). In addition, each of the oils which may be tested as described above solidifies over a relatively narrow range of temperatures which is within the accuracy of the standard test method. Pour points measured by the method and apparatus described above are well within the 5° F. accuracy of the standard method, ASTM D97-57.

The above-described apparatus has been found to offer a number of advantages over other methods and similar instruments for determining pour point. The use of the thermoelectric element materially reduces refrigeration problems, and makes the apparatus simpler and more economical to construct and operate. Particularly, the programming of the sequence of events as described is accomplished without the need for more intricate and complex machinery, and a superior accuracy and repeatability of results has been achieved.

Comparison tests were conducted over a period of approximately 20 days wherein pour points were determined for a light catalytic cycle oil stream. The pour point specification for this oil is 5° F. The results obtained by the above-described instrument were compared with results obtained from the standard ASTM test for a large number of samples. Repeatability of the instrumental method was found to be several degrees better than the plus or minus 5° F. spread permissible in the standard manual test.

While the present invention has been described in terms of a preferred embodiment thereof, it is apparent from the foregoing description that alternate details of operation and construction will become apparent to the skilled artisan. It will be understood that such alternatives fall within the spirit and scope of the present invention.

Having described my invention, what I claim is:

1. Apparatus for determining the pour point of an oil which apparatus comprises an apparatus housing, a thermally conductive sample cell positioned within said housing, said sample cell having a shallow cavity being adapted to contain a thin, plate-like sample of oil at a constant level therein, a thermoelectric element within said housing and in thermal contact with said sample cell, said thermoelectric element being adapted to cool said sample and said sample cell to at least the solidification temperature of said sample, means for introducing an oil sample into said sample cell, light source means for directing a beam of light onto the surface of said sample, light sensitive receiving means for receiving light reflected from the surface of said sample, means for indicating the temperature of said sample at which a change occurs in the reflectivity of the surface of said sample as a measure of said pour point, means for heating said cooled sample to at least its flow point subsequent to the occurrence of said change in said sample surface reflectivity, and means for flushing said heated sample from said sample cell.

2. The apparatus of claim 1 wherein cooling rate control means are provided for cooling said sample to at least about 30° F. at a first rate and thereafter to cool said sample at a second faster rate.

3. The apparatus of claim 1 wherein heating means comprise means for reversing the direction of current flow through said thermoelectric element during said cooling period and subsequent to the occurrence of said change in reflectivity of said sample surface whereby said sample is heated to a temperature at which said sample is flowable.

4. The apparatus of claim 1 wherein the bottom surface of said sample cell has a reflectivity less than the reflectivity of the surface of the sample contained therein.

5. The apparatus of claim 1 wherein there is provided a means for maintaining pressure on the surface of said sample to aid in removing said sample from said sample cell.

References Cited in the file of this patent

UNITED STATES PATENTS

| | | |
|---|---|---|
| 2,635,456 | Barstow | Apr. 21, 1953 |
| 2,979,950 | Leone | Apr. 18, 1961 |
| 3,031,880 | Findlay | May 1, 1962 |
| 3,077,764 | Kapff | Feb. 19, 1963 |